United States Patent Office 2,991,308
Patented July 4, 1961

2,991,308
SYNTHESIS OF EXO-NORBORNEOL

Charles A. Cohen, Roselle Park, N.J., assignor to Esso Research and Engineering Company, a corporation of Delaware
No Drawing. Filed Dec. 30, 1957, Ser. No. 705,821
3 Claims. (Cl. 260—514)

This invention relates to the preparation of cyclic dicarboxylic acids having five carbon atoms in the ring. Particularly, it relates to the preparation of norcamphoric acid or an alkyl substituted norcamphoric acid, starting with a cyclopentadiene hydrocarbon and a lower monoolefin. In a specific embodiment, the invention relates to the condensation of cyclopentadiene with ethylene, followed by the hydration of tht resulting norbornylene by means of an acid catalyst, and finally the oxidation of the resulting norborneol to yield norcamphoric acid.

Norcamphoric acid, or cyclopentane-1,3-dicarboxylic acid, as well as the alkyl substituted norcamphoric acids, have been finding an increasing number of applications as intermediates in the fields of resins, fibers, synthetic lubricating oils, greases, plasticizers, and the like. Copending application, Serial Number 655,946, now U.S. Patent No. 2,957,022, describes the usefulness of the esters of norcamphoric acid as lubricants, such esters having very low pour points and high viscosity indices. The esters also appear to have good plasticizing properties, especially for vinyl resins such as polyvinyl chloride.

The development in the use of norcamphoric acid and the corresponding alkyl substituted acids has been slow, however, because of the relative difficulty and expense of their preparation. Until now, norcamphoric acid has been prepared on a laboratory scale by the oxidation of norbornylene with potassium or sodium permanganate (Birch et. al., Journ. Chem. Soc. 818, 1947). This synthesis has not been carried out on a commercial scale since the high cost of potassium permanganate would render such a process uneconomical.

It is therefore an object of this invention to provide a new and economical method of preparation for norcamphoric acids and alkyl substituted norcamphoric acids. Another object of this invention is to provide a preparation of norcamphoric acid from raw materials available in the refinery streams, viz, cyclopentadienes and lower monoolefins. These and other objects will become more clearly apparent as the invention is set forth in detail hereinafter.

It has now been found that norbornylene, or bicyclo (2,2,1)heptene-2, and alkyl substituted norbornylenes may be hydrated by means of an acid hydration catalyst to the corresponding norborneol, or bicyclo(2,2,1)heptanol-2, which may then be oxidized by a strong oxidizing agent to the norcamphoric acid. Since norbornylene may be prepared by the reaction of a cyclopentadiene hydrocarbon and a lower olefin, both of which are available in the refinery streams, particularly steam-cracked fractions, the present invention makes it possible to prepare the highly desirable norcamphoric acids directly from raw materials readily available in the petroleum industry.

For purposes of illustration, the invention will be described herein with reference to the preparation of norcamphoric acid. However, it should be understood that the same teachings apply equally to the preparation of the alkyl substituted norcamphoric acids. The general series of reactions for such a process may be represented as follows:

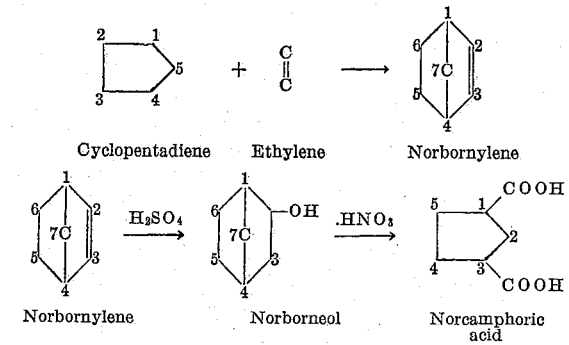

Cyclopentadiene    Ethylene    Norbornylene

Norbornylene    Norborneol    Norcamphoric acid

The cyclopentadiene hydrocarbons which may be reacted with an olefin herein, may be defined as monocyclopentadiene hydrocarbons having no more than one $C_1$–$C_4$ alkyl side chain. This definition includes cyclopentadiene itself and monoalkyl substituted cyclopentadienes wherein the alkyl group has 1 to 4 carbon atoms, preferably being a methyl group, such as 1-methyl cyclopentadiene, 2-methyl cyclopentadiene, and the like. The olefins preferred for this invention are the alpha olefins having 2 to 4 carbon atoms, such as ethylene, propylene and butene-1.

The Diels-Alder condensation of cyclopentadiene and ethylene to form norbornylene has been described by Joshel and Butz in J.A.C.S. 63, 3350 (1941). Generally, the reaction proceeds by contacting about equimolecular proportions of the reactants, but more usually with an excess of the monoolefin, under a pressure of 20 atm. for the higher olefins up to as high as 500–1000 atmospheres for the lower olefins, e.g., ethylene, and at a temperature from 150° to 250° C., preferably 200° to 230° C. A reaction time of from 3 to 24 hours, dependent somewhat on the degree of agitation employed, is required, and a yield of norbornylene usually greater than 85% is obtained.

It is also suitable in this invention to charge the dimers of the cyclopentadiene hydrocarbons, e.g., dicyclopentadiene, dimethyldicyclopentadiene, etc., to the condensation reactor rather than the monomers. It should be understood, however, that it is the monomer that reacts with the olefin. The dimers easily depolymerize to the monomers under the condensation temperatures employed, which then enter into the condensation reaction with the olefin reactant.

The cyclic monoolefin resulting from the above condensation may be defined as a bicyclo(2,2,1)heptene having no more than one $C_1$–$C_4$ alkyl side chain, preferably a methyl group. The hydration of this compound, e.g., norbornylene, takes place in the presence of an acid hydration catalyst, preferably sulfuric acid having a concentration of 75 to 100%, preferably 80 to 90%. One mole of norbornylene is first dissolved in about 1 to 2 parts by weight of a nonreactive solvent such as paraffinic and cycloparaffinic hydrocarbons, e.g., isooctane, cyclohexane, and the like. This solution is then contacted with about 1 to 10 mole equivalents, preferably 2 to 8 mole equivalents of acid catalyst. The temperature is maintained at about 0° to 30° C., preferably 5° to 20° C. for about 0.5 to 5.0 hours, usually for 1 to 3 hours. Atmospheric pressure is generally maintained, although higher or lower pressures are suitable. The solid, crystalline norborneol is recovered by steam distillation, ether extraction, or the like, in about quantitative yield, seldom lower than about 90% yield. The norborneol recovered corresponds to the "exo" isomer as compared to the "endo" isomer recovered by the prior method of synthesis using vinyl acetate as described by Alder and Rickert: Ann. 543, 1, 15, 18, 21 (1940). The exo isomer melts at 127°–128° C. in comparison with the endo isomer which melts at 149°–150° C.

The intermediate product may be generically defined as a bicyclo(2,2,1)heptanol having no more than one $C_1$–$C_4$ alkyl side chain, preferably a methyl group. This intermediate product, e.g., norborneol, is then dissolved in about 1 to 4 parts of a nonreactive solvent such as a paraffinic hydrocarbon, e.g. isooctane, and the solution is added to about 4 to 10 mole equivalents per mole of norborneol of a strong oxidizing agent, preferably 40–60% nitric acid. The mixture is heated to about 50° to 80° C., preferably 55° to 65° C. Again atmospheric pressure is usually employed though higher or lower pressures are also suitable. An oxidation catalyst, usually a weak acid such as vanadic acid, molybdic acid, and the like, is also preferably present in an amount of 0.1 to 0.5 part per part of nitric acid.

After heating for about 1 to 4 hours, usually 1.5 to 2.5 hours, the reaction mixture is charged to a distillation unit operated at reduced pressure, preferably at 10 to 25 mm. Hg. Here, the excess nitric acid is recovered as distillate and the residual mixture is treated with $SO_2$ or an inorganic sulfite, or the like, to destroy residual nitric acid. The residue is then extracted with 1 to 10 parts per part solids of a selective solvent such as benzene, water, and the like, to recover the norcamphoric acid. The dibasic acid may then be purified by conventional evaporation, or by distillation to give the acid and/or anhydride.

Raw materials preferable for the practice of this invention and the corresponding condensation product thereof are shown in Table I below.

a rise in pressure which reached a maximum of 9750 p.s.i.g. at 160° C. and then dropped as the ethylene was consumed during the reaction. Heating and agitation were continued at 200°–205° C. for a total of 16 hours, after which time the bomb and contents were cooled to 25° C. The contents of the bomb, which was a nearly white, crystalline solid weighing 816 grams, was distilled once through a Vigreaux column, thereby obtaining a forerun boiling up to 94° C. weighing 15 grams, a heart cut boiling at 94° to 98° C. weighing 750 grams, and a bottoms consisting mainly of higher polymers of cyclopentadiene weighing 50 grams. The middle fraction was redistilled through a 30 plate Oldershaw column using a 20 to 1 reflux ratio to obtain a fraction boiling at 96.3°–96.7° C. (uncorr.) weighing 709 grams, which represents an 87 mol percent yield of norbornylene.

EXAMPLE 2

*Preparation of exo-norborneol*

One liter of 85 wt. percent sulfuric acid was added to a 2 liter reaction flask fitted with a stirrer, thermometer and dropping funnel. The acid was cooled to 5° C. and a solution of 188 grams of the norbornylene, prepared in Example 1, in 200 ml. of isooctane was slowly added with good stirring over the course of 45 minutes while the temperature was maintained between 5° to 8° C. by means of an ice-salt bath. Stirring was continued for an addition 2¼ hours at a maximum temperature of 10° C. and the reaction mixture then poured into 3 liters of ice water. Norborneol is volatile with steam and can be recovered from the reaction mixture by steam distillation but in this instance, the diluted reaction mixture was permitted to settle whereupon three layers were formed: a lower aqueous acid layer and two upper oily layers.

The aqueous acid layer was separated and extracted with ethyl ether, and the ether extracts were added to the combined oily layers. The ether-oil mixture was water washed to remove residual acidity and the water

TABLE I

| No. | Diolefin | Olefin | Bicyclo(2,2,1)Heptene | | | |
|---|---|---|---|---|---|---|
| | | | Product | B.P., 760 mm. | D 20/4° C. | N 20°/D |
| 1 | Cyclopentadiene | Ethylene | Bicycloheptene - 2 (Norbornylene). | 96.1° | Solid—M.P. | 46° C. |
| 2 | ___do___ | Propylene | 5-Methyl-Bicyclo-Heptene-2 | 115.9–116.3° C. | 0.8653–6 | 1.4598. |
| 3 | ___do___ | Butene-1 | 5-Ethyl-Bicyclo-Heptene-2 | 143.4–143.8° C. | 0.8668–70 | 1.4615–7. |
| 4 | 1-Methylcyclo-pentadiene | Ethylene | 1-Methyl-Bicyclo-Heptene-2 | 104.8° C. | | |
| 5 | ___do___ | Propylene | 1,5 and 1,6 Dimethyl Bicycloheptene-2. | 126–136° C. | | |
| 6 | ___do___ | Ethylene | 2-Methyl-Bicyclo-Heptene-2 | 117.8° C. | | |
| 7 | ___do___ | Propylene | 2,5- and 2,6-Dimethyl Bicycloheptene-2. | 126–136° C.[1] | | |

[1] Products 5 and 7 were made from a mixture of approximately 35% of 1-methyl cyclopentadiene and 65% of 2-methyl cyclopentadiene. On condensation with propylene, four isomers are obtained as shown above, boiling within the range indicated.

All of the bicycloheptenes shown in Table I are suitable for the practice of this invention but it should be noted that in the subsequent oxidation process, products 6 and 7 yield keto acids as intermediates as described hereinafter. These may be further oxidized to dibasic acids, with for example, alkaline hypohalites.

The present invention will be more fully understood after reference to the following specific embodiments. Limitation of the invention thereby is not intended.

Unless otherwise designated, all ratios and percentages are given throughout on a weight basis.

EXAMPLE 1

*Preparation of norbornylene*

Six hundred grams of dicyclopentadiene (95.5% purity) were charged to a 3 liter chrom-molybdenum rocking-bomb autoclave and, after flushing with nitrogen to remove air, were pressured with a technical grade ethylene at 1250 p.s.i.g. Heating and agitation were begun, with washes were added to the unextracted aqueous acid solution.

The acid solution was then steam distilled to hydrolyze any sulfuric acid esters of norborneol and to recover the regenerated and dissolved norborneol. The norborneol which distilled overhead with the water was recovered by extraction with ether, and the ether extracts were added to the washed ether-oil mixture, which was then subjected to distillation through a Vigreaux column. After removing the ether and isooctane the vapor temperature rose rapidly to 175° C. The residue was cooled, and crystallized from petroleum ether. There was obtained 206 grams of a snow-white crystalline product melting at 127°–128° C. The above represents a yield of 92 mol percent of the theoretical and corresponds to the exo isomer of norborneol.

EXAMPLE 3

*Preparation of norcamphoric acid*

A 2 liter reaction flask fitted with stirrer, thermometer, dropping funnel and reflux condenser was charged with 1 liter of 50 wt. percent nitric acid. One gram of ammonium metavandate was dissolved in the acid by heating and stirring at 53° C. The mixture was cooled to 50° C. and a solution of 112 grams of the exo-Norborneol, prepared in Example 2, dissolved in 400 ml. of isooctane, was added over the course of one-hour to the acid. As addition proceeded the temperature rose to 57° C. requiring cooling to prevent the temperature from rising even higher. Stirring was continued for a further 1½ hours at 57°–58° C. when the reaction appeared to be complete.

The reaction mixture was transferred to a distilling flask fitted with a 50 cm. Vigreaux column ad distilled under the reduced pressure of a water aspirator. Recovered overhead were the isooctane and 932 ml. of dilute nitric acid which boiled at 38°–40° C. and weighed 1167 grams. The residue, which contained some residual nitric acid, was diluted with about an equal volume of water and treated with solid-granular sodium sulfite until no further evolution of gas was observed. The mixture solidified on cooling and had an odor of norcamphor. The crude product was dissolved in water, acidified with sulfuric acid and exhaustively extracted with ether. The ether extract was distilled to recover ether, and the residue was distilled under reduced pressure. There was recovered overhead norcamphor boiling at 55°–60° C. at 15 mm. Hg pressure. The residue was nearly pure norcamphoric acid as shown by a neutralization equivalent of .078 (theoretical=0.079) and a melting point of 116° C. A single crystallization from water gave a snow-white crystalline product melting at 119.5°–120° C. in a yield of 75 grams. Norcamphor may be recycled in the oxidation process to future batches, and the spent nitric acid may be fortified to 50% strength for reuse.

Having thus described the general nature and specific embodiments of the present invention, the true scope is now particularly pointed out in the appended claims.

What is claimed is:

1. A process for preparing cyclopentane-1,3-dicarboxylic acids which comprises admixing a bicyclo(2,2,1)-heptanol having no more than a single $C_1$–$C_4$ alkyl side chain with 4 to 10 mole equivalents of 40–60% nitric acid and 0.1 to 0.5 part by weight of vanadic acid per part of nitric acid at a temperature above 50° C. but below the boiling temperature of said acid, maintaining the resultant admixture within said temperature range for from 1 to 4 hours, distilling the admixture under reduced pressure to remove substantially all excess nitric acid, and recovering the solid dicarboxylic acid from the residue.

2. A process according to claim 1 wherein the bicyclo-(2,2,1)heptanol has a methyl side chain.

3. A process according to claim 1 wherein the bicyclo(2,2,1)heptanol is norborneol.

References Cited in the file of this patent

Vogel: Jour. Chem. Soc. (London), page 911 (1931).
Joshel et al.: Jour. Amer. Chem. Soc., vol. 63, pages 3350–3351 (1941).
Bruson et al.: Jour. Amer. Chem. Soc., vol. 67, pages 723 and 725 (1945).
Bartlett et al.: Jour. Amer. Chem. Soc., vol. 68, pages 6–8 (1946).